United States Patent [19]

Moritz

[11] 4,434,957
[45] Mar. 6, 1984

[54] LOW DRAG SURFACE

[75] Inventor: Robert R. Moritz, Conyers, Ga.

[73] Assignee: Rolls-Royce Incorporated, New York, N.Y.

[21] Appl. No.: 363,449

[22] Filed: Mar. 30, 1982

[51] Int. Cl.³ .................... B64C 3/14; B64C 23/06
[52] U.S. Cl. .................... 244/35 R; 244/130; 416/223 R
[58] Field of Search ............ 244/35 R, 198, 199, 244/200, 130, 35 A; 416/223 R, 235, 236 R; 296/1 S; 137/808

[56] References Cited

U.S. PATENT DOCUMENTS

| 1,726,882 | 9/1929 | Boerner | 244/130 |
| 1,831,780 | 11/1931 | Sharp | 244/198 |
| 3,000,401 | 9/1961 | Ringleb | 244/200 |
| 3,578,264 | 5/1971 | Kuethe | 244/199 |
| 3,588,005 | 6/1971 | Rethorst | 244/200 |

FOREIGN PATENT DOCUMENTS

| 134220 | 9/1902 | Fed. Rep. of Germany | 244/35 R |
| 456012 | 8/1913 | France | 244/200 |

Primary Examiner—Trygve M. Blix
Assistant Examiner—Rodney Corl
Attorney, Agent, or Firm—Cushman, Darby & Cushman

[57] ABSTRACT

A low drag surface comprises at its upstream edge an intermittent linear vortex producing means extending transverse to the flow of fluid across the surface. The vortex producing means produces a succession of rolling vortices which roll across the surface reducing the drag between the main flow and the surface.

4 Claims, 1 Drawing Figure

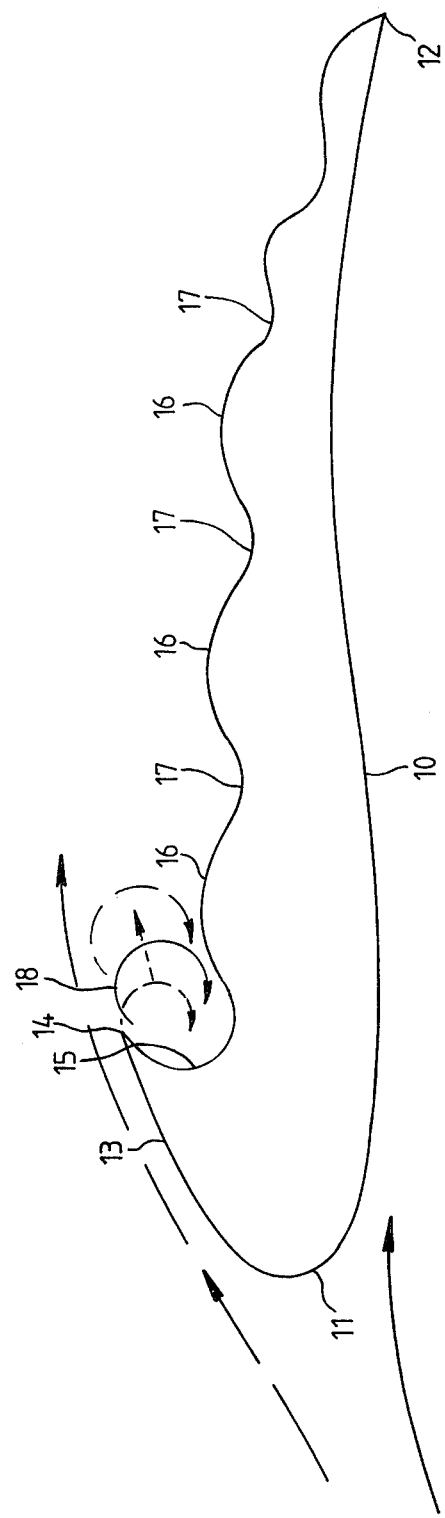

LOW DRAG SURFACE

This invention relates to a low drag surface.

For any surface over which a fluid flows, a drag is set up between the fluid and the surface. This drag is basically caused by the fact that the fluid forms a 'boundary layer' in which its velocity is reduced to a varying degree from that of the remaining flow. To reduce the velocity in this way demands the expenditure of energy, and the energy, which is expended as heat, appears as the drag between the surface and the fluid.

This drag is evidently undesirable, because it represents a waste of energy which reduces the efficiency of the fluid flow device of which the surface is a part. This device may for instance comprise a gas turbine engine, in which case the surface may be that of an aerofoil blade or vane, or it may for instance comprise a ships' propulsion unit in which case the surface could be of the propellor or even of the ships' hull itself.

There have been numerous attempts to reduce this drag, generally by modifying the boundary layer. Thus the boundary layer may be sucked away through pores in the surface, reducing its thickness and thus its drag. Alternatively the boundary layer may be energized by blowing fluid into it in the direction of the fluid flow. These are complex and difficult techniques to perfect, and have not met with general success.

The present invention proposes a form of surface which uses a novel fluid dynamic technique to achieve a low drag.

According to the present invention a low drag surface having a flow of fluid across it comprises, at its upstream edge, an intermittent linear vortex producing means extending transverse to the direction of said flow and producing a succession of rolling vortices extending transverse to said flow, whereby the rolling vortices thus produced move across said surface to reduce the drag on the surface.

The major portion of said surface may be formed with corrugations extending transverse to the direction of said flow and providing temporary retention for said vortices so as to regulate their passage across the surface.

The vortex producing means may comprise a reentrant discontinuity in the surface, the discontinuity providing a sheltered leeward face against which each said vortex may form. A ramp may be provided downstream of the discontinuity to cause the vortices to detach from the face.

The invention will now be particularly described, merely by way of example, with reference to the accompanying drawing which shows a section through an aerofoil having a surface in accordance with the present invention. It will be understood that the features shown in profile in the drawing will in fact extend longitudinally of the aerofoil to a greater or lesser degree.

In the drawing the aerofoil is seen to have a conventional undersurface 10 in the form of a gently concave configuration, bounded at its upstream extremity by a leading edge 11 and at its downstream extremity by a trailing edge 12.

The upper surface of the aerofoil is not conventional and shows a form of structure in accordance with the invention for producing low drag. The upper part of the leading edge 11 has a portion 13 which diverges relatively rapidly from the under surface 10. This diverging part 13 terminates at 14 to form a discontinuity, and a part-circular section reentrant leeward face 15 extending downwardly and initially forwardly from the discontinuity 14. The face 15 curves rearward to blend with the first hump 16 of a series of humps and depressions 16 which together form a corrugated surface extending back to the trailing edge 12.

Operation of the aerofoil involves the conventional aerodynamic flow over the under surface 10. Air flowing over the upper surface, however, is forced upwardly by the diverging part or portion 13 of the surface and detaches therefrom at the discontinuity 14 of the surface of the aerofoil to form a vortex against the reentrant leeward face 15. This vortex is shown by the arrows at 18, and is of course a linear vortex longitudinally extending to substantially the same degree as the discontinuity 14.

Any pertubation of the vortex 18 in a downstream direction will alter the relationship between the main stream flow and the vortex, and will cause the vortex to begin to rise up the ramp formed by the forward part of the hump 16. The ramp of the first hump 16 causes the vortex to rise more into the main stream which produces a lift on the vortex with a strong component in the direction of flow. Once the displacement of the vortex in a downstream direction away from the discontinuity 14 is significant, a second vortex will form at the discontinuity, thus reducing the 'suck-on' force between the vortex and the leeward surface 15.

The first vortex will thus be released to flow with the airstream, rolling over the surface downstream of the discontinuity 14 as the second vortex grows against the re-entrant leeward face 15. The first vortex will move downstream until it reaches the first depression 17 between the first hump 16 and the second hump 16, where it will rest instantaneously in metastable equilibrium.

the process will then repeat itself, and the second vortex, when freed from the re-entrant leeward face 15 by the formation of a third vortex, will approach the first depression 17 and will dislodge the first vortex which will move to the next depression 17. In this way a succession of vortices will be formed and will march downstream in unison, the spacing of the vortices being controlled by the spacing of the depressions 17.

The upper surface will thus be covered with a succession of marching vortices, and these vortices will act in a manner analogous to roller bearings in reducing the drag between the main airflow and the surface. At the same time the heat transfer between the fluid and the surface will be reduced, which may be of importance in e.g. turbine blades where the fluid is hot.

It will therefore be seen that the surface configuration enables the drag between the fluid flow and the surface to be reduced. Clearly the dimensions of the various features of the surface will need to be carefully chosen to match the particular conditions of flow; indeed it may be that effective operation will only occur over a limited range of flow conditions.

Again, there are of course modifications which could be made to the particular configuration illustrated. Thus in particular it may be possible to delete the corrugations formed by the humps 16 and hollows or depressions 17, albeit at the expense of a less effective drag reduction.

I claim:

1. A low drag surface having an upstream edge and a downstream edge and having a flow of fluid across the same in a direction from the upstream edge toward the downstream edge, said low drag surface comprising an intermittent linear vortex producing means spaced downstream of the upstream edge and extending transverse to the direction of said flow of fluid across the surface for producing a succession of rolling vortices extending transverse to the flow of fluid, said intermittent linear vortex producing means including a re-entrant discontinuity in the surface, the discontinuity extending transverse to said flow and providing a sheltered leeward face against which each of said vortices may be successively formed; and means spaced downstream from said discontinuity and defining a ramp parallel therewith, said ramp being inclined outwardly from the surface and causing each of said vortices, when formed against said sheltered leeward face, to be dislodged from the sheltered leeward face to permit another vortex to be formed, the successively formed vortices being allowed to roll in a downstream direction across the surface in succession to reduce the drag on the surface.

2. A low drag surface as claimed in claim 1 in which a major portion of said surface downstream of said intermittent linear vortex producing means is formed into corrugations extending transverse to the direction of said flow of fluid, said corrugations providing temporary retention for said vortices so as to regulate their rolling passage across the surface.

3. A low drag surface as claimed in claim 2 in which said corrugations are defined by alternating humps and depressions.

4. A low drag surface as claimed in claim 3 in which the most upstream hump also defines said ramp.

* * * * *